United States Patent [19]

Chozui

[11] Patent Number: 6,167,287
[45] Date of Patent: Dec. 26, 2000

[54] PORTABLE CELLULAR PHONE

[75] Inventor: Sadatoshi Chozui, Kanagawa, Japan

[73] Assignee: Matsushita Electric Industrial Co., Ltd, Osaka, Japan

[21] Appl. No.: 09/099,812

[22] Filed: Jun. 19, 1998

[30] Foreign Application Priority Data

Jul. 7, 1997 [JP] Japan ..................................... 9-180864

[51] Int. Cl.$^7$ .................................................. H04M 1/21
[52] U.S. Cl. ......................... 455/566; 455/557; 455/550; 704/8; 704/1; 345/171
[58] Field of Search ..................................... 455/566, 550, 455/557; 379/88.06, 88.05; 704/8, 6, 1; 345/171; 707/535; 400/484; 341/28

[56] References Cited

U.S. PATENT DOCUMENTS

| | | | |
|---|---|---|---|
| 5,774,061 | 6/1998 | Kudoh | 340/825.44 |
| 5,903,859 | 5/1999 | Stone et al. | 704/8 |
| 5,946,376 | 8/1999 | Cistulli | 379/88.06 |

FOREIGN PATENT DOCUMENTS

| | | |
|---|---|---|
| 4-150444 | 5/1992 | Japan . |
| 7-273853 | 10/1995 | Japan . |
| 2 299 239 | 9/1996 | United Kingdom . |

*Primary Examiner*—Daniel S. Hunter
*Assistant Examiner*—Alan Gantt
*Attorney, Agent, or Firm*—Pearne & Gordon LLP

[57] ABSTRACT

A character code such as Chinese characters desired to be used in a portable cellular phone 101 is received from an external information terminal 111. A display character data set corresponding the thus-received character code is also received from the external information terminal 111 and is stored in a storage section 105. At this time, only the data which are not stored in the storage section 105 are stored through a checking operation by checking means 107. The control section 106 sends the thus-received character code to a display control section 104. The display control section 104 reads from the storage section 105 a display character data set corresponding to the thus-received character code and displays the display character data set on a display 103. Further, the thus-received character code is stored in a storage section 102 while a telephone number is added to the character code. If necessary, the character code is deleted by means of deletion means 109. The portable cellular phone is capable of displaying Chinese characters to store only display character data sets required by a user without incorporation of Chinese character conversion means, through receipt and storage of display character data sets from an external information terminal such as a personal computer or an electronic notepad.

4 Claims, 2 Drawing Sheets

PORTABLE CELLULAR PHONE

BACKGROUND OF THE INVENTION

The present invention relates to a portable cellular phone capable of displaying characters including Chinese characters.

FIG. 2 is a block diagram of a conventional portable cellular phone having a function of being able to display Chinese characters and store a character code as telephone directory data while a telephone number data set is added to the character code. In FIG. 2, reference numeral 201 designates a portable cellular phone; 202 designates a telephone directory storage section; 203 designates a display section; 204 designates a display control section; 205 designates a display character data storage section for storing character data for display purpose; 206 designates a control section for controlling the overall portable cellular phone; and 207 designates a Chinese character converter section.

With regard to the example mentioned above, the operation of the cellular phone for displaying characters including Chinese characters will now be described. To the control section 206 is sent a Chinese character code into which Japanese-kana characters or roman alphabetic letters are converted by the Chinese character conversion means 207. The control section 206 adds a telephone number data set to a character code including the received Chinese character code, as required, and stores the Chinese character code into the telephone directory storage section 202. The control section 206 sends to the display control section 204 the character code including the Chinese character code received from the Chinese character conversion means 207 or from the telephone directory storage section 202. The display control section 204 reads from the display character data storage section 205 character data for display purposes corresponding to the received character code and displays the thus-read character data on the display 203.

However, the conventional portable cellular phone mentioned previously requires incorporation of Chinese character conversion means for converting into a Chinese character code from a character code, such as Japanese-kana characters or roman alphabetic letters, and a display character data storage section for storing display character data corresponding to all characters beforehand. For this reason, contrasted with another type of portable cellular phone incapable of displaying or storing Chinese characters, the aforementioned cellular phone is required to store an enormous amount of character data for display purposes. Another problem of the foregoing conventional cellular phone is the necessity of storing character data sets which are not used by the user.

SUMMARY OF THE INVENTION

The present invention is intended to solve the foregoing drawbacks of the conventional portable cellular phone, and the object of the present invention is to provide a portable cellular phone capable of storing only display data sets required by a user, through receipt and storage of display character data sets from an external information terminal such as a personal computer or an electronic notepad.

To accomplish the foregoing object, the present invention provides a portable cellular phone comprising: interface means for transmitting or receiving a display character data set to or from an external information terminal; storage means for storing the display character code received from the external information terminal; storage means for storing a character code received from the external information terminal as a telephone directory data set while a telephone number data set is added to the character code; and control means for controlling each of the aforementioned means. The control means includes means for determining whether or not the display character data set received from the external information terminal has already been stored in the storage means, means for determining whether or not the character code included in the telephone directory data set stored in the storage means is used for another telephone directory data set within the storage means, and means for deleting a display character data set corresponding to the character code only when the character code is not used for another telephone directory data set within the storage section.

By means of the foregoing configuration, there can be implemented a portable cellular phone which does not require incorporation of Chinese character conversion means into a portable cellular phone body and which enables storage of only display character data sets required by the user, through receipt of display character data sets from an external information terminal, such as a personal computer or an electronic notepad, and through storage of the thus-received data sets.

According to a first aspect of the present patent application, there is provided a portable cellular phone comprising: display means capable of displaying Chinese characters; interface means for transmitting or receiving a display character data set to or from an external information terminal; storage means for storing the display character code received from the external information terminal; storage means for storing a character code received from the external information terminal as a telephone directory data set while a telephone number data set is added to the character code; and control means for controlling each of the aforementioned means. The portable cellular phone body does not include the Chinese character conversion means. The portable cellular phone can store only display character sets required by the user, through receipt of display character data sets from an external information terminal such as a personal computer or an electronic notepad and through storage of the thus-received data sets. Further, the portable cellular phone can use the thus-received display character data sets as display character data sets for a telephone directory of the cellular phone.

According to the present invention, the control means comprises means for determining whether or not the display character data sets received from the external information terminal are already stored in the storage means. In addition to the foregoing operations, the cellular phone can prevent storage of display character data in an overlapping manner.

Further, according to the present invention, the control means comprising means for determining whether or not the character code included in the telephone directory data set stored in the storage means is used for another telephone directory data set within the storage means, and means for deleting a display character data set corresponding to the character code only when the character code is not used for another telephone directory data set within the storage section. In addition to the foregoing operations, the cellular phone can delete the display character data that are not required by the user.

DETAILED DESCRIPTION OF THE PREFERRED EMBODIMENTS

Figure 1:
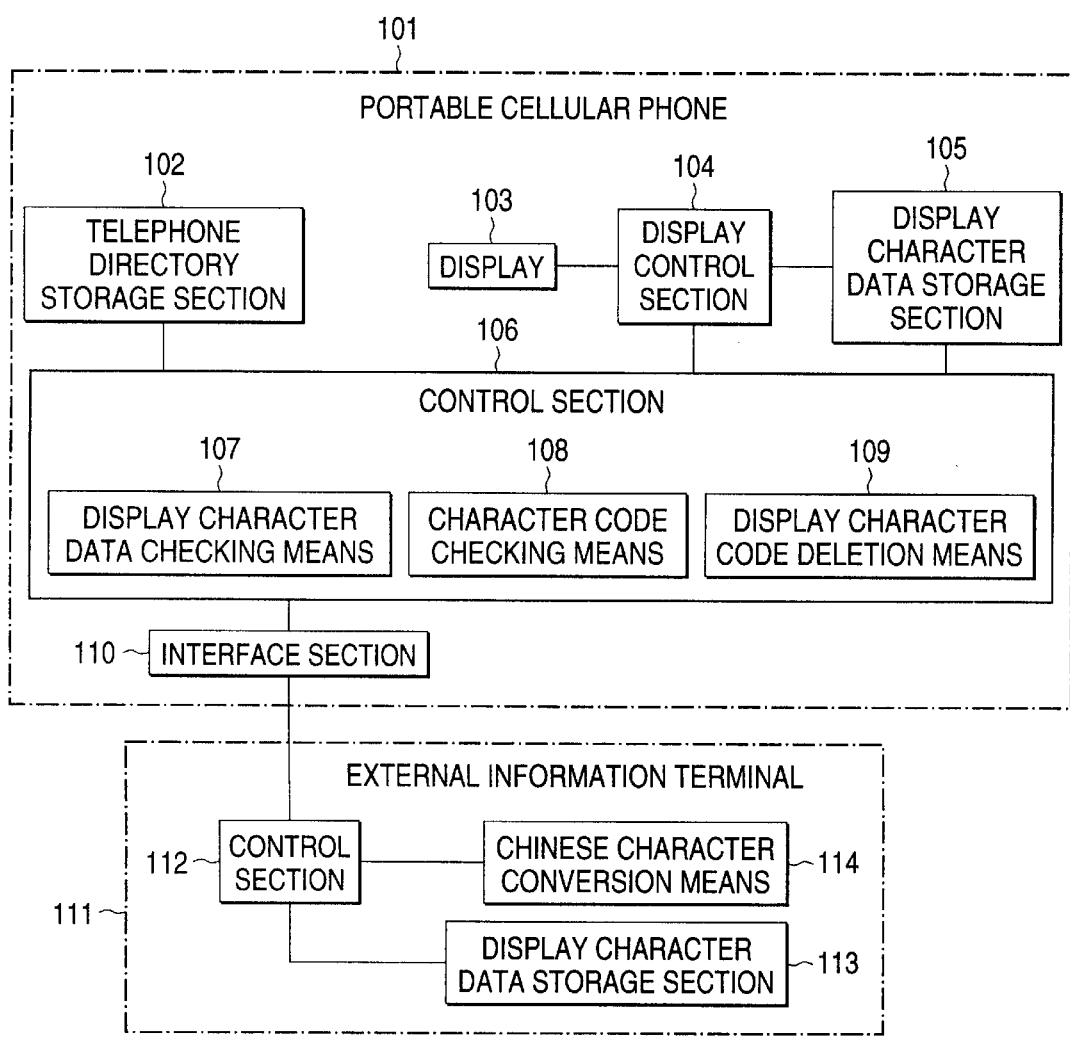
FIG. 1 is a block diagram showing the configuration of a portable cellular phone according to an embodiment of the present invention.
Figure 2:
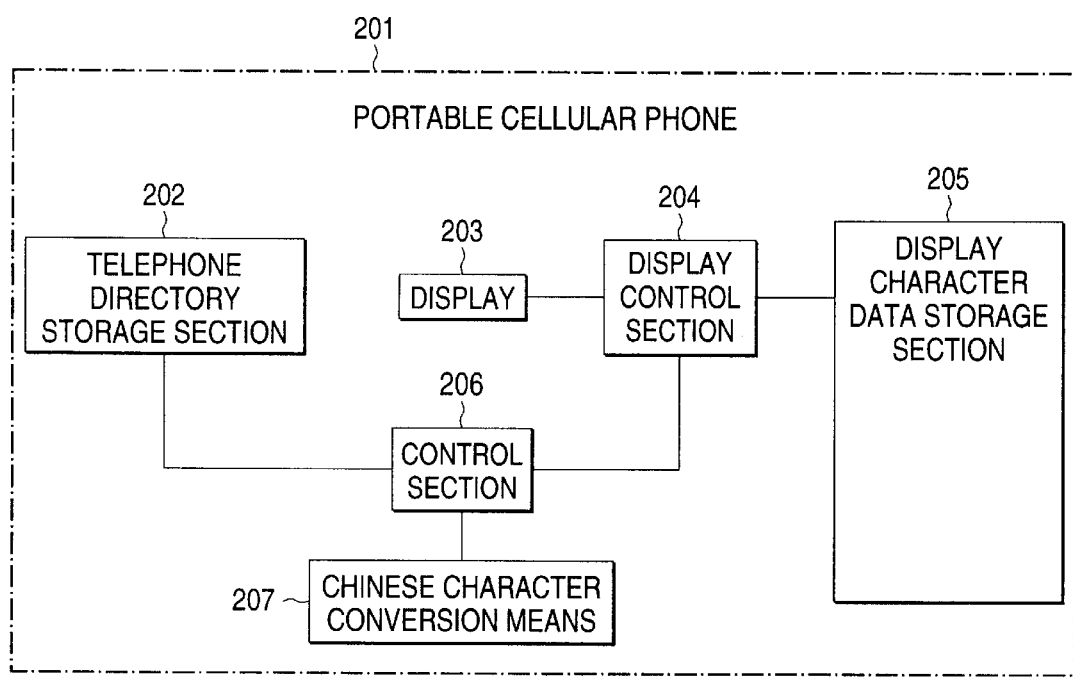
FIG. 2 is a block diagram showing the configuration of an existing portable cellular phone capable of displaying Chinese characters, as well as of storing a character code as a telephone director data set while a telephone number data set is added to the character code.

An embodiment of the present invention will be described by reference to the accompanying drawings. FIG. 1 is a block diagram showing a portable cellular phone according to an embodiment of the present invention. In FIG. 1, reference numeral 101 designates the entirety of a portable cellular phone which comprises a telephone directory storage section 102, a display 103, a display control section 104, a display character data storage section 105, a control section 106, and an interface section 110. The control section 106 comprises display character data checking means 107, character code checking means 108, and display character data deletion means 109. Reference numeral 111 designates an external information terminal such as a personal computer or an electronic notepad. The information terminal 111 comprises a control section 112 connected to the interface section 110 of the cellular phone 101, a display character data storage section 113, and Chinese character conversion means 114.

Exchange of a character code or a display character code data set between the portable cellular phone 101 and the external information terminal 111 according to the present embodiment will now be described. First, the control section 112 of the external information terminal 111 prepares character codes such as Chinese characters desired to be used in the cellular phone 101, through use of the Chinese character conversion means 114 which converts Japanese kana characters or roman alphabetic letters into a Chinese character code. By way of the interface section 110 of the cellular phone 101, the control section 112 of the external information terminal 111 sends to the control section 106 a character code including the thus-prepared Chinese character code. Simultaneously, by way of the interface section 110 of the cellular phone 101 the control section 112 of the external information terminal 111 sends from the display character data storage section 113 to the control section 106 a display character data set corresponding to the thus-sent character code. By means of the display character data checking means 107, the control section 106 of the cellular phone 101 determines whether or not the received display character data set is stored in the display character data storage section 105. Only the display character data sets which have not been previously stored in the storage section are stored in the display character data storage section 105.

When a telephone number data set is added to the character code, the control section 106 of the cellular phone 101 stores the received character code into the telephone directory storage section 102 as a telephone directory data set. Further, when the user attempts to delete the telephone directory data set stored in the telephone directory storage section 102, the control section 106 checks, through use of the character code checking means 108, the character codes included in the telephone directory data set desired to be deleted against the character codes included in another telephone directory data set stored in the telephone directory storage section 102. Through checking operations, the control section 106 determines whether or not the character code included in the telephone directory data set desired to be deleted is used for another telephone directory data set stored in the telephone directory storage section 102. Only when the character code is not used, the control section 106 deletes, through use of the display character data deletion means 109, a display character data set corresponding to the character code from the display character data storage section 105.

The control section 106 of the cellular phone 101 sends to the display control section 104 the character code including the Chinese character code received from the external information terminal 111 or the telephone directory storage section 112. The display control section 104 reads from the display character data storage section 105 a display character data set corresponding to the thus-received character code and displays the thus-read display character data set on the display 103.

As has been described above, according to the present embodiment, the portable cellular phone 101 comprises therein the telephone directory storage section 102, the display 103, the display control section 104, the display character data storage section 105, the control section 106, and the interface section 110. The control section 106 comprises the display character data checking means 107, the character code checking means 108, and the display character data deletion means 109. Without incorporation of Chinese character conversion means into the portable cellular phone body, the display character data sets required by the user can be stored through receipt and storage of display character data sets from the external information terminal, such as a personal computer or an electronic notepad. Further, the thus-received display character data can also be used as display character data for the telephone directory of the portable cellular phone.

Although the foregoing explanation has described the present invention implemented in the form of a portable cellular phone, the present invention can be carried out in the manner analogous to that mentioned previously even when applied to a receiver for individual calling purpose or to a mobile telephone.

As has been described above, the present invention enables implementation of a portable cellular phone capable of storing the display character data sets required by a user, through receipt and storage of display character data sets from an external information terminal, such as a personal computer or an electronic notepad, without incorporation of Chinese character conversion means into the portable cellular phone body.

What is claimed is:

1. A portable cellular phone comprising:

display means capable of displaying Chinese characters;

a control section including an interface means for receiving a character code and a display character data set from an external information terminal;

first storage means for storing a telephone directory data set, said telephone directory data set comprising a telephone number data set added to the character code received from the external information terminal;

second storage means for storing the display character data set, which corresponds to said character code and is received from the external information terminal; and control means for controlling the display means, the interface means, and the first and second storage means.

2. The portable cellular phone as claimed in claim 1, wherein said control means comprises means for determin ing whether the display character data sets received from the external information terminal are already stored in the storage means.

3. The portable cellular phone as claimed in claim 1, wherein the control means comprises:

means for determining, prior to deletion of a character code, whether the character code included in the telephone directory data set stored in the storage means is used for another telephone directory data set within the storage means; and means for deleting a display character data set corresponding to the character code only when the character code is not used for another telephone directory data set within the storage section.

4. The portable cellular phone as claimed in claim 2, wherein the control means comprises:

means for determining, prior to deletion of a character code, whether the character code included in the telephone directory data set stored in the storage means is used for another telephone directory data set within the storage means; and means for deleting a display character data set corresponding to the character code only when the character code is not used for another telephone directory data set within the storage section.

* * * * *